(12) United States Patent
Fogwill et al.

(10) Patent No.: US 11,764,049 B2
(45) Date of Patent: Sep. 19, 2023

(54) COAXIAL INTRODUCTION OF CALIBRANT IN A FLOW PATH WITH ANALYTE TO AN ION SOURCE

(71) Applicant: Waters Technologies Corporation, Milford, MA (US)

(72) Inventors: Michael O. Fogwill, Uxbridge, MA (US); Joseph D. Michienzi, Plainville, MA (US); Sylvain Gilles Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 63 days.

(21) Appl. No.: 17/230,793

(22) Filed: Apr. 14, 2021

(65) Prior Publication Data
US 2021/0319995 A1    Oct. 14, 2021

Related U.S. Application Data

(60) Provisional application No. 63/009,683, filed on Apr. 14, 2020.

(51) Int. Cl.
*H01J 49/00*     (2006.01)
*H01J 49/04*     (2006.01)
*G01N 30/72*     (2006.01)
*H01J 49/16*     (2006.01)

(52) U.S. Cl.
CPC ...... *H01J 49/0495* (2013.01); *G01N 30/7206* (2013.01); *G01N 30/7233* (2013.01); *H01J 49/0009* (2013.01); *H01J 49/165* (2013.01)

(58) Field of Classification Search
CPC .. H01J 49/0495; H01J 49/0009; H01J 49/165; H01J 49/0431; G01N 30/7206; G01N 30/7233; G01N 30/7266; G01N 2030/625
USPC ...................................... 250/281, 282, 288
See application file for complete search history.

(56) References Cited

U.S. PATENT DOCUMENTS

| | | | | |
|---|---|---|---|---|
| 5,703,360 A | * | 12/1997 | Fischer | H01J 49/0009 250/252.1 |
| 2007/0048187 A1 | * | 3/2007 | Sheehan | G01N 30/34 422/89 |
| 2008/0314129 A1 | * | 12/2008 | Schultz | G01N 30/80 250/288 |
| 2009/0050212 A1 | * | 2/2009 | Dourdeville | G01N 30/20 137/625.46 |

(Continued)

*Primary Examiner* — Michael Maskell
(74) *Attorney, Agent, or Firm* — Goodwin Procter LLP

(57) ABSTRACT

Exemplary embodiments may deploy a valve that introduces a sample of a calibrant coaxially with flow exiting a source of a mobile phase flow, such as a liquid chromatography (LC) column, on a path to an ion source for the mass spectrometer (MS). The valve may be positioned remotely on a branch that has a junction with the path leading form the source of the mobile phase flow to the ion source. Alternatively, the valve may be positioned in line on the flow path from the source of the mobile phase flow to the ion source of the MS. A novel five port valve design may be employed. With this valve design, a first position of the valve allows a sample loop for the calibrant to be filled. In a second position, the calibrant is added coaxially to the flow from the source of the mobile phase to the MS. In a third position of the valve, diversion of or infusion to a post-source flow is enabled.

17 Claims, 15 Drawing Sheets

(56) References Cited

U.S. PATENT DOCUMENTS

2011/0278446 A1* 11/2011 Jiang ................... G01N 33/15
                                                                   250/282
2013/0075598 A1* 3/2013 Ledford, Jr. ........ H01J 49/0009
                                                                   250/252.1

\* cited by examiner

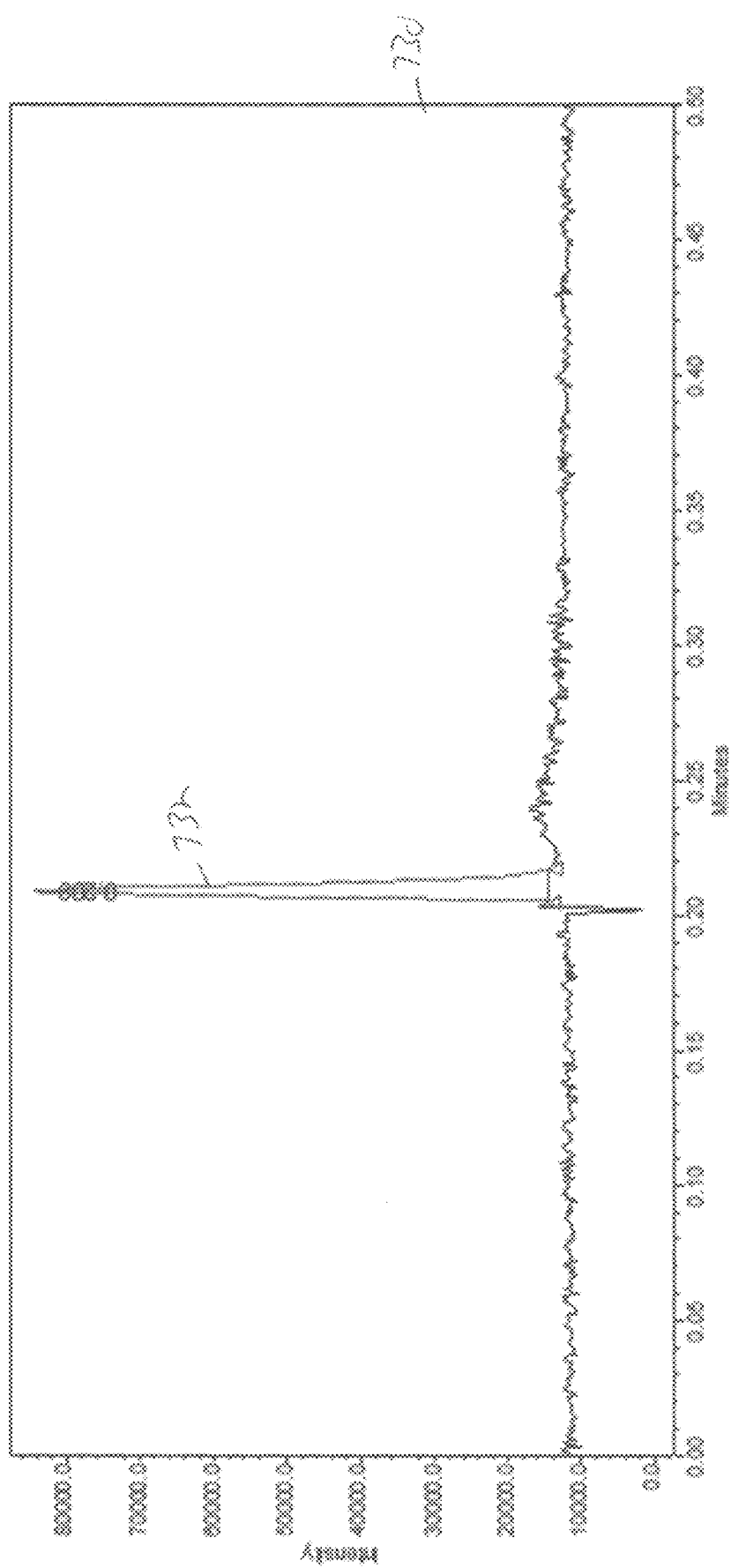

COAXIAL INTRODUCTION OF CALIBRANT IN A FLOW PATH WITH ANALYTE TO AN ION SOURCE

CROSS-REFERENCE TO RELATED APPLICATIONS

This application claims the benefit of and priority to U.S. Provisional Patent Application No. 63/009,683, filed on Apr. 14, 2020, the entire contents of which is hereby incorporated by reference.

BACKGROUND

Liquid chromatography mass spectrometry (LCMS) systems pass an analyte in a mobile phase through a liquid chromatography (LC) column and then pass the analyte that exits the LC column through a mass spectrometer. The analyte must be ionized before being introduced to the mass spectrometer. A common approach to ionizing the analyte is to use electrospray ionization. In electrospray ionization, an electrospray ionizer applies a high voltage to a liquid to create an aerosol containing analyte ions.

Time of flight (TOF) mass spectrometers must be calibrated frequently. Thermal changes, voltage settings, the degree of penetration of ions at reflectrons, drift in electronics, etc. may affect the equipment of TOF mass spectrometer so as to alter the distance travelled by the ions. One way to calibrate the TOF mass spectrometer is to introduce a calibrant of known characteristics and measure the flight time of the calibrant ions in the mass spectrometer. The calibrant must be ionized before introduction. Based on these time of flight values, the mass spectrometer may be adjusted to be properly calibrated.

FIG. 1 depicts a conventional arrangement 100 for ionizing both the analyte and the calibrant. The analyte is in the mobile phase (containing solvents) through the LC column 102 to the ionization unit 103. The ionization unit contains two points of ionization (POIs) 104 and 106, such as electrospray ionizers (ESIs). POI 104 ionizes and sprays the analyte from the LC column 102, whereas POI 106 ionizes and sprays the calibrant sample 110. A moveable baffle 108 is provided to block one of the POIs 104 and 106. In FIG. 1, the baffle 108 is positioned to block the ions from POI 104 and to allow the spray from POI 106. Hence, the calibrant ions in the aerosol from POI 106 are able to enter the mass spectrometer (MS) sample inlet 112, while the analyte ions from POI 104 are blocked and largely prevented from entering the MS sample inlet 112. When the baffle 108 is moved to the position shown in phantom form to block POI 106, the calibrant spray is blocked, and the analyte spray from POI 104 is permitted to enter the MS sample inlet 112.

There are a number of drawbacks to the conventional approach depicted in FIG. 1. First, this approach is expensive in that it requires two points of ionization, a baffle and a motor or other mechanism to move the baffle. Second, the baffle 108 can create unexpected field effects and gas dynamics in the ionization unit 103. Third, while the baffle 108 is blocking the POI 104, no information regarding the analyte can be recorded.

SUMMARY

In accordance with an exemplary embodiment, a mass spectrometry system includes a source of a mobile phase which includes an analyte. The system also includes an ion source for producing ions. The ion source has an input. The system further includes a first flow path for the analyte to flow from the source of the mobile phase to the input of the ion source and a second flow path coupled to the first flow path for a calibrant sample to flow to the input of the ion source. The system additionally includes a valve coupled to the second flow path. The valve has a first position for filling a sample loop with the calibrant sample and a second position for causing the calibrant sample to flow from the sample loop to the second flow path onto the first flow path to the input of the ion source. The system also includes a mass spectrometer for receiving analyte ions and calibrant ions from the ion source and analyzing the ions.

The system may include a calibrant source for providing the calibrant sample. The system may include an injector for injecting the calibrant sample to the valve to fill the sample loop and may include a pump connected to the valve. The pump may be configured to pump the calibrant sample out of the sample loop when the valve is in the second position. The system may also include a detector for detecting the ions. The mobile phase may be one of a liquid chromatography mobile phase, a gas chromatography mobile phase, a supercritical fluid mobile phase or a sample or sample solution directly infused into the mass spectrometer.

In accordance with an exemplary embodiment, a mass spectrometry system includes a source of a mobile phase that includes an analyte. The system includes a flow path for the analyte to flow from the source of the mobile phase and a valve connected along the flow path for adding a sample of calibrant into the flow path. The system further includes an ion source ionizer for producing ions, the ion source having an input and wherein the flow path leads to the input of the ion source so that the electrospray ionizer produces analyte ions and calibrant ions. The system additionally includes a mass spectrometer for receiving analyte ions and calibrant ions from the ion source and for analyzing the ions.

The system may include a calibrant source for providing the sample of calibrant. The system may include an injector for injecting the calibrant sample to the valve to fill the sample loop. The valve may include a position for flow along the flow path to push the sample of calibrant out of the sample loop into the flow path. The mobile phase may be one of a liquid chromatography mobile phase, a gas chromatography mobile phase, a supercritical fluid mobile phase, or a sample or sample solution directly infused into the mass spectrometer. The ion source may be an electrospray ion source.

In accordance with an exemplary embodiment, a calibrant provision assembly includes a flow path for a mobile phase or an analyte to flow to an ion source. The assembly also includes a sample loop for holding a calibrant sample. In addition, the assembly includes a valve having a first position for filling the sample loop with the calibrant sample and a second position for causing the calibrant sample to flow from the sample loop onto the first flow path to the input of the ion source.

The mobile phase may be one of a liquid chromatography mobile phase, a gas chromatography mobile phase, a supercritical fluid mobile phase, or a sample or sample solution directly infused into the mass spectrometer.

The valve may be connected inline on the flow path or may be connected to another flow path that has a junction with the flow path. The assembly may include an injector for injecting the calibrant sample to the valve to fill the sample loop. The assembly may include a pump connected to the valve. The valve may have a connection to waste. The ion source may be an electrospray ion source.

In accordance with an exemplary embodiment, a valve comprises a rotor with a first pair of ports, a second pair of ports, a central port, a peripherally situated trace and a radially extending trace that is positioned to extend from the central port. The valve also includes a disk stator having a trace. The disk rotor is rotationally coupled to the stator having, wherein the disk rotor and the stator are rotationally coupled to have a load position in which the trace of the disk stator is positioned to connect the first pair of ports, the peripherally situated trace of the disk rotor is positioned to connect the second pair of ports and the central port is not connected to another one of the ports. The valve has an inject position in which the trace of the disk stator is positioned to connect the second pair of ports, the first pair of ports are not connected, the peripherally situated trace connects one of the second pair of ports and the central port is not connected to another one of the ports. The valve also has a divert/infuse position in which the trace of the disk stator is positioned to connect the second pair of ports, the first pair of ports are not connected and the radially extending trace of the disk rotor is positioned to connect the central port with one of the ports of the second pair of ports.

The first pair of ports may be positioned on an outer periphery of the rotor. The second pair of ports may be positioned on an outer periphery of the rotor. The rotor may be a flat disk.

BRIEF DESCRIPTION OF THE DRAWINGS

FIG. 7B depicts an illustrative calibrant peak in a chromatogram in the second exemplary embodiment.

DETAILED DESCRIPTION

Figure 1:
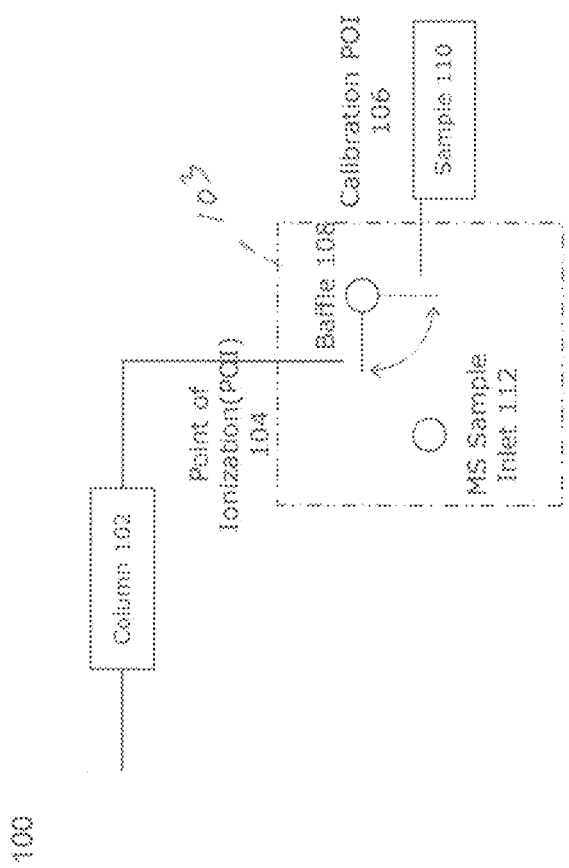
FIG. 1 depicts a diagram of a conventional arrangement for introducing calibrant ions to a mass spectrometer.

Exemplary embodiments described herein may overcome the problems of the conventional system depicted in FIG. 1. The exemplary embodiments may require only a single ion source and may not require a baffle. The lack of a baffle avoids in the exemplary embodiments the need for a motor and the problems relating to the unexpected field effects and gas flow. Moreover, the exemplary embodiments may allow analyte ions to continue to enter and be analyzed by an MS while the calibrant is introduced into the flow for an ion source of an MS.

Exemplary embodiments may deploy a valve that introduces a sample of the calibrant coaxially with the flow exiting a source of a mobile phase flow on the path to an ion source for the MS. The valve may be positioned remotely on a branch that has a junction with the path leading form the source of the mobile phase flow to the ion source. Alternatively, the valve may be positioned in line on the flow path from the source of the mobile phase flow to the ion source of the MS.

The source of the mobile phase flow may take a number of different forms. For example, the source may be from a liquid chromatography (LC) system, a gas chromatography (GC) system, a supercritical fluid chromatography (SFC) system (such as a $CO_2$-based chromatography system, or a compressible fluid chromatography system), a capillary electrophoresis system. The source may also be a source of a direct infusion of an analyte or an analyte in solution. More generally, the source may be any form of separation system that is coupled to the MS. Other examples of sources include those found in a rapid evaporative ionization (REI) MS system or a direct electrospray ionization (DESI) MS system. For illustrative purposes, a liquid chromatography system will be used as an example.

In some exemplary embodiments a novel five port valve design may be employed. With this valve design, a first position of the valve enables the analyte to pass to the MS while also allowing a sample loop for the calibrant to be filled. In a second position of the valve, the calibrant is added coaxially to the flow from the source of the mobile phase flow to the MS. The valve may be controlled in the second position so as to quickly cut off the flow of the calibrant to create a pinch injection. In a third position of the valve, a central port may be connected with a peripheral port to create a diversion of flow to the central port or an injection into the flow from the central port.

The valve may be a flat disk valve. The valve may include a stator and a rotor that are interconnected. The rotor may be connected to a step motor or other actuator for rotating the rotor relative to the stator to achieve the desired positions. The motor may be controlled by a control system under automated control.

Figure 2:
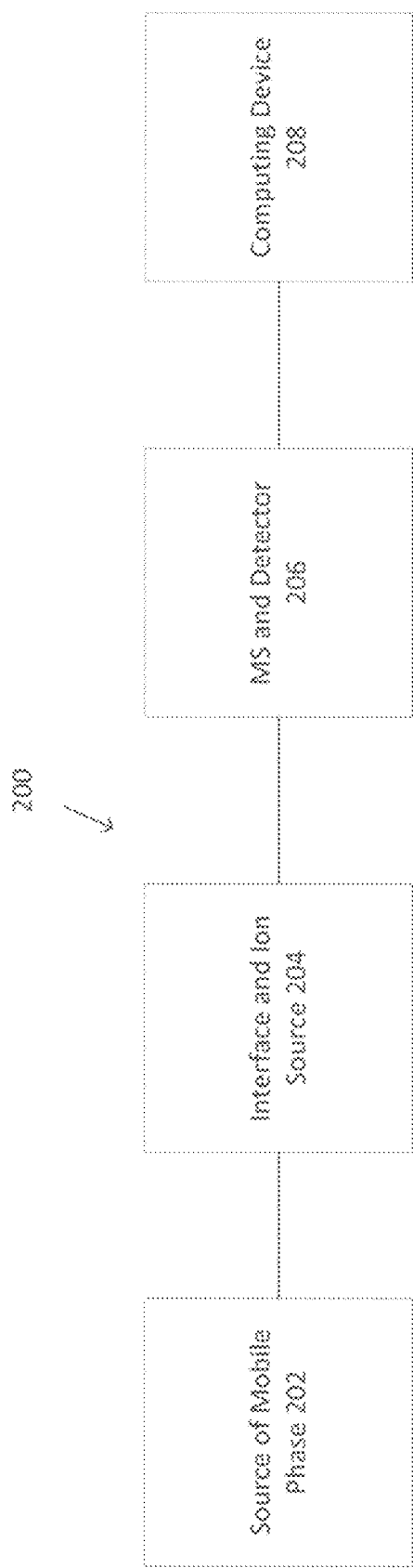
FIG. 2 depicts a block diagram of components of an MS system.

FIG. 2 depicts an illustrative MS system 200 suitable for practicing exemplary embodiments. The LCMS system includes a source of a mobile phase flow 202. The source of the mobile phase flow 202 may be, for example, an LC system, a GC system, an SFC system, a capillary electrophoresis system, a REIMS system, a DESI system or other separation and/or ionization system.

Figure 3:
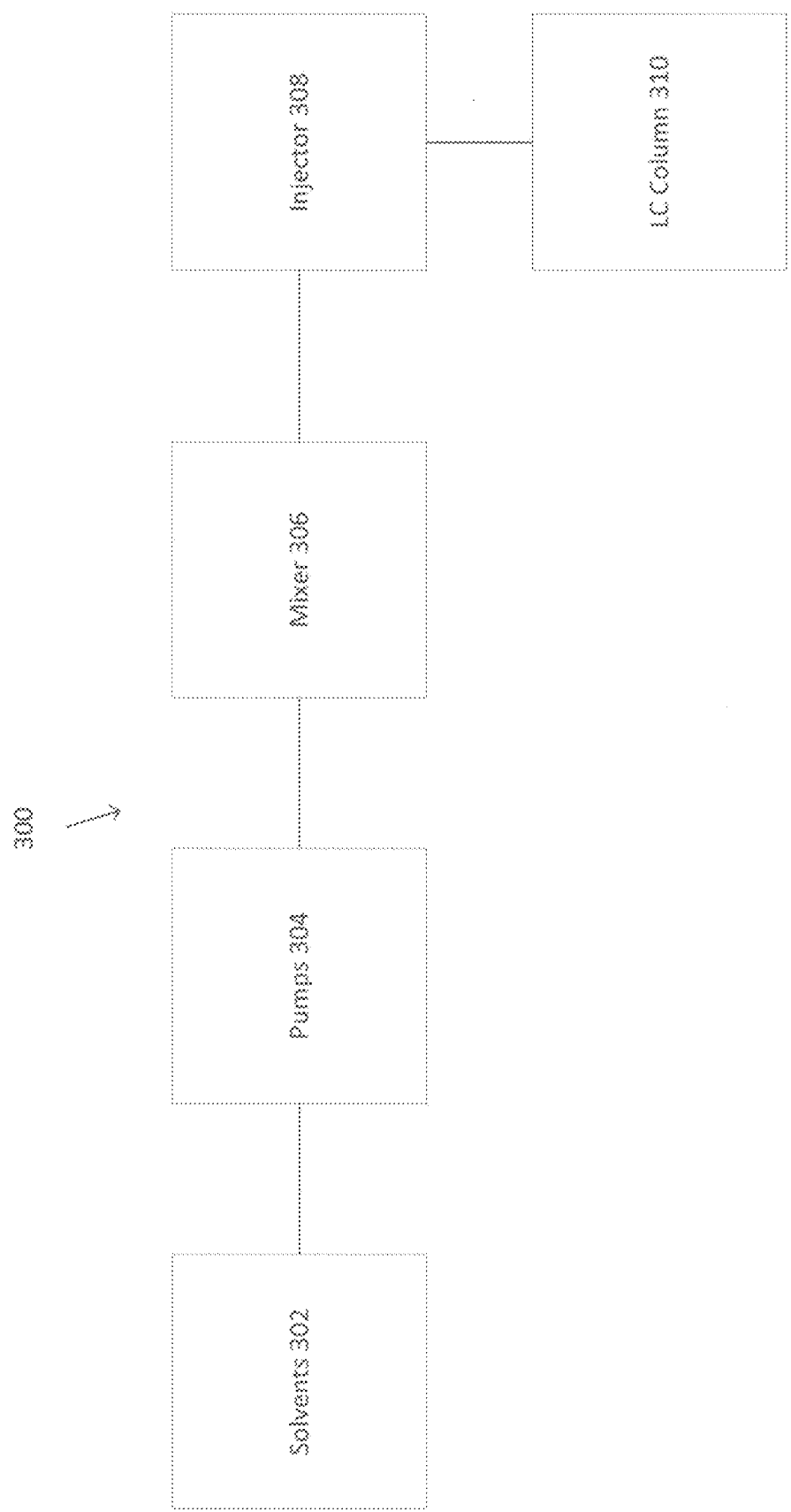
FIG. 3 depicts a block diagram of components of an LC system.

FIG. 3 depicts a more detailed block diagram of the case where the source of the mobile phase 202 is an LC system 300. The LC system 300 includes solvents 302 stored in sources, like bottles or other reservoirs, that may be sampled to create a mobile phase that will be passed through an LC column 310. One or more pumps 304 pump the solvents 302 that are sampled from the sources in desired ratios. The solvents are mixed in a mixer 306 and passed toward the LC column 310. An injector 308 injects an analyte sample 307 into the flow path with the solvents toward the LC column 310. The resulting mobile phase passes through the LC column 310.

As shown in FIG. 1, the flow exits the source of the mobile phase flow 202 and passes to an interface and ion source 204 for the MS. In the interface and ion source 204, the analyte is ionized and the calibrant is ionized as will be described in more detail below. The ions are then passed to the MS 206 where mass spectrometry is performed on the ions. The ions are then detected by detector 208. The MS system 200 may include a computer system 210 for visualizing the results, controlling the MS system 200 and performing additional operations on the results.

Figure 4A:
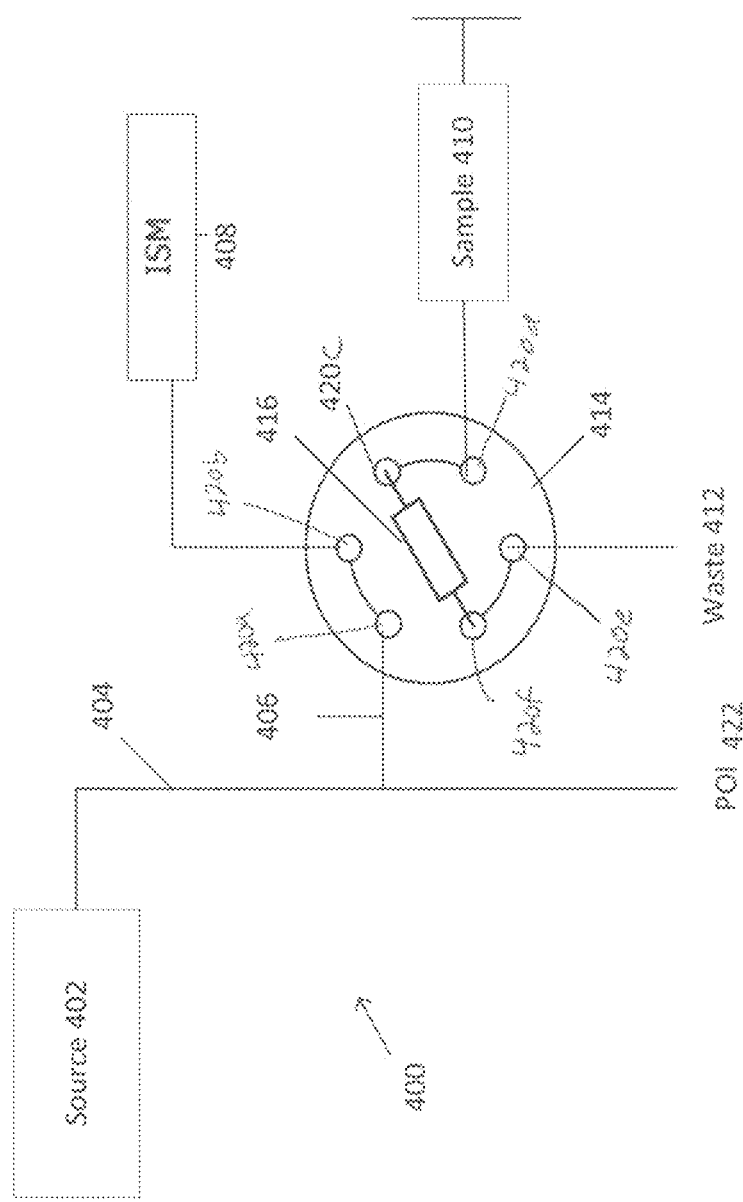
FIG. 4A depicts a remote valve arrangement for introducing calibrant to a flow leading to an ESI in a first exemplary embodiment wherein a valve is in a load position.

The exemplary embodiments provide some improvements in the interface and ion source 204. In particular, the exemplary embodiments may provide an improved calibration provision assembly for providing calibrant. FIG. 4A depicts a first exemplary embodiment of a calibrant provision assembly 400. In this embodiment 400, a source of mobile phase flow 402 has an outlet coupled to a flow path 404 leading to a POI 422 in the interface and ion source 204. POI 422 may be an ESI, an atmospheric pressure chemical ionizer (APCI), an atmospheric pressure photo ionizer (APPI), an ESCi multi-mode ionization, impactor spray ionizer, a thermospray ionizer, a fast atom bombardment (FAB), chemical ionizer (CI), an electron ionizer (EI), a DESI ionizer, a REIMS, a laser ablation ESI (LAESI) system, a direct analysis in real time (DART) system or the like. The source of the mobile phase flow 402 may be, for instance an LC column, such as a high-performance LC column (HPLC). The flow path 404 may be created by tubing or other types of conduits. The flow out of the source of the mobile phase flow 402 may include solvents and/or analyte at different concentrations at various points in time. A second flow path 406 connects to the first flow path 404 at a junction. A remotely situated valve 414 is connected along this second flow path 406. The remotely situated valve 414 may be, for example, a flat disk valve. In this example, the remotely situated valve 414 is a six port, two-position valve. The remotely situated valve 414 includes ports 412a-412f. In other embodiments, the remotely situated valve 414 may include additional ports or fewer ports.

FIG. 4A depicts the valve 414 in the load position where the calibrant is loaded into a sample loop 416. In this load position, port 420a is connected to the second flow path 406. Port 420b is connected to a pump 408, such as an isocratic solvent manager (ISM), for pumping liquid out of the valve onto the second flow path 406. A trace in the rotor of the valve connects port 420b with port 420. Port 420d is connected to an injector 410 that hold a sample of the calibrant. Port 420c is shown in a valve position where port 420c may has a connection via trace with port 420d. Port 420c has a connection with a sample loop 416. Port 420f is connected with the sample loop and has a trace leading to the port 420e. Port 420e leads to waste 412. Thus, the injector 410 injects the calibrant, and the calibrant flows through port 420d, to port 420c through the sample loop 416 to port 420 and on to port 420e to waste 412.

Figure 5A:
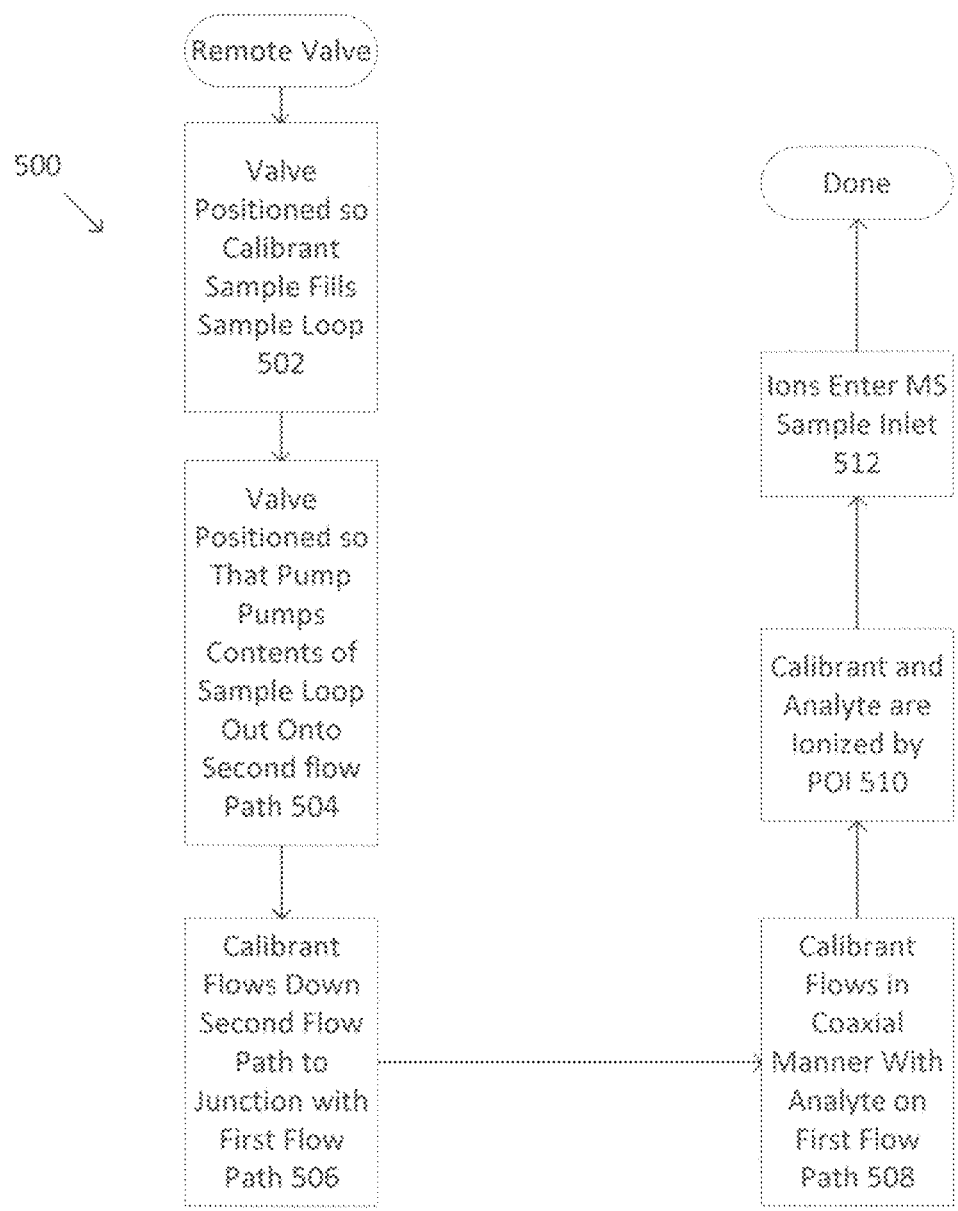
FIG. 5A depicts a flowchart of steps that may be performed in the first exemplary embodiment.

As shown in the flowchart 500 of FIG. 5A, the calibrant fills the sample loop 416 (502) by activating the injector 410 and operating the valve so that port is connected with the injector 410 and ports 420d and 420c are connected.

The valve position of the valve 414 may then be changed to the inject position shown in FIG. 4B. As can be seen in FIG. 4B, the pump 408 now is connected to the sample loop 416 by virtue of ports 420b and 420c being connected. Moreover, the sample loop now is in fluid communication with the second flow path 406 since ports 420f and 420a are now connected. In addition, the injector 410 now is connected to waste 412 due to ports 420d and 420e being connected.

In this inject valve position, pump 408 pumps the calibrant sample out of the sample loop 416 and on to the second flow path 406 (504). The calibrant flows down the second flow path 406 to the junction with the first flow path 404 (506). The calibrant then flows in a coaxial manner with the analyte flow from the source of the mobile phase flow 402 on the first flow path 404 (508). The analyte and calibrant flow on first flow path 404 reach the ESI 422 and are ionized by the ESI (510). The ESI (510) may be, for example, direct electrospray ionization system. The analyte ions and the calibrant ions then enter the MS sample inlet (512).

Figure 5B:
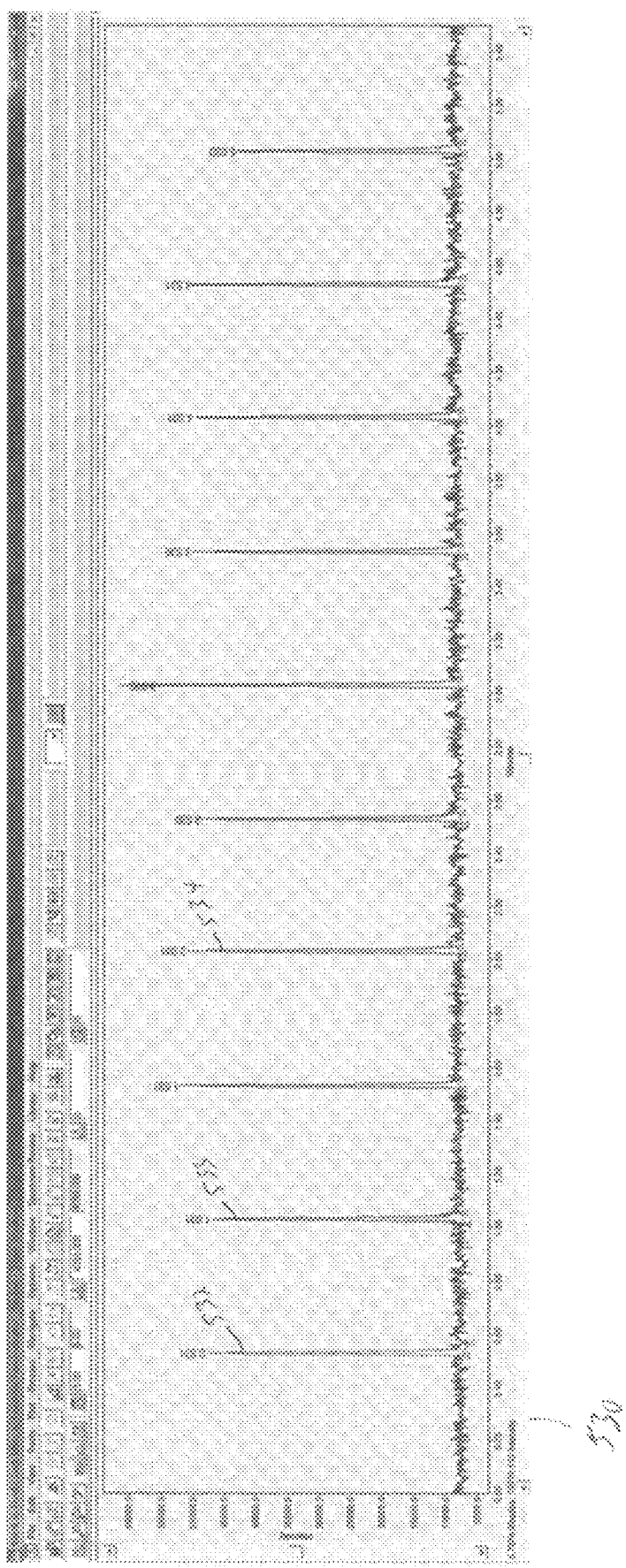
FIG. 5B depicts illustrative calibrant peaks for the first exemplary embodiment in a chromatogram.

FIG. 5B shows an example of the detected results of using this configuration in a MS system. The chromatogram 530 of time versus intensity shows multiple pulses, such as pulses 532, 533 and 534 for the injected calibrant samples. Column was a 2.1×100 mm 1.7 μm BEH C18. The mobile phase was an isocratic mixture of 25% acetonitrile, 75% water, each containing 0.1% v/v formic acid. Isocratic. Flowing at 500 μL/min. The calibrant was 50 μg/mL uracil prepared in water with 0.1% v/v formic acid. The addition pump pushed water with 0.1% v/v formic acid at 100 μL/min.

Figure 5C:
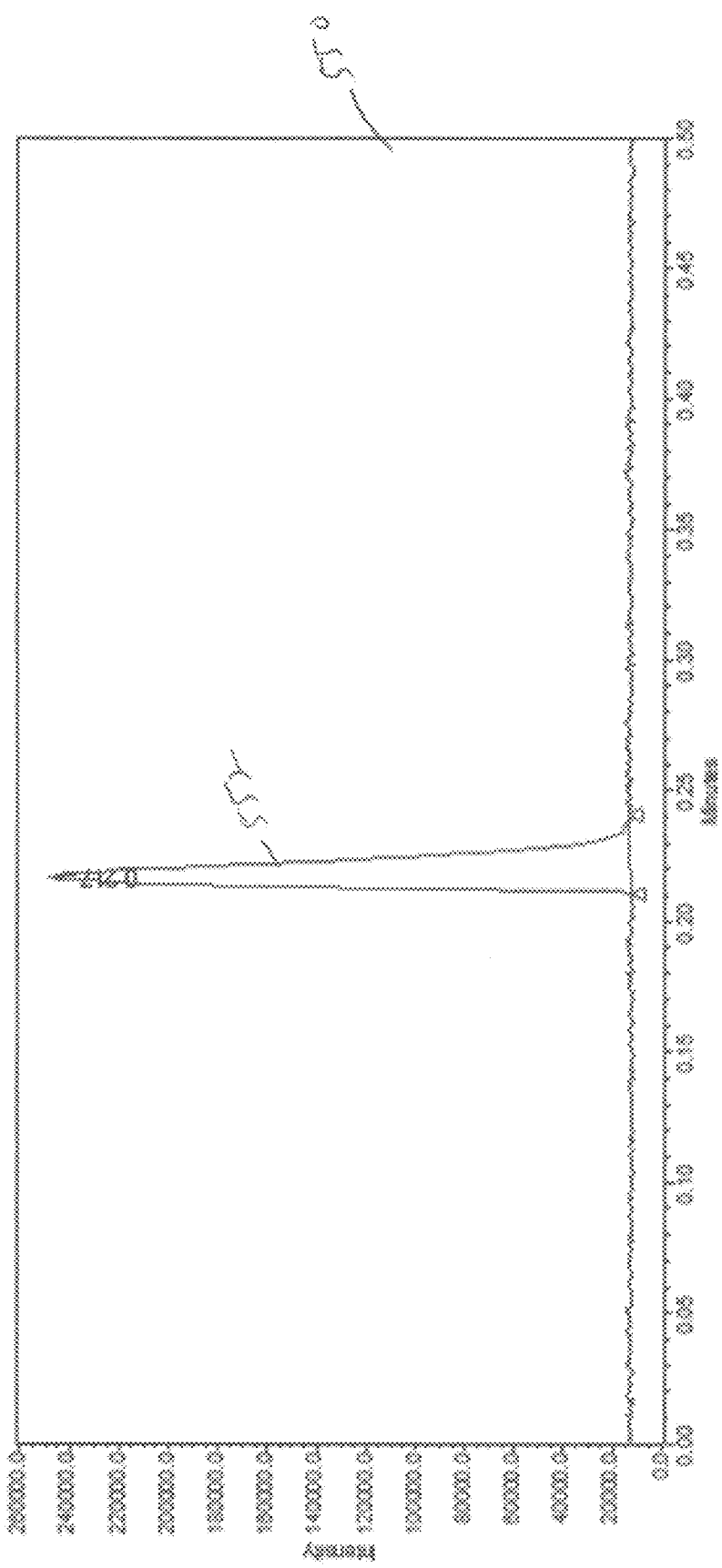
FIG. 5C depicts an illustrative calibrant peak in a chromatogram where pinch injection is used in the first exemplary embodiment.

One issue that arises is depicted in this chromatogram relates to the width of the peaks and tailing at the peaks. Such a width and tailing may suppress analyte results. Thus, a pinch injection may be performed where the injection valve is rapidly switched from load to inject and back to load. The pinch injection results in narrower peaks for the calibrant and less tailing and thus less suppression of the analyte results. FIG. 5C shows the chromatogram 550 of intensity over time for a single calibrant peak 552 where pinch injection is used. The same particulars of the column, calibrant, etc. as was described for FIG. 5B were used. The peak widths at the base for the peaks in FIG. 5B are approximately 1.2 seconds, whereas the peak 552 in FIG. 5C at the base is approximately 1 second and thus, is narrower. In addition, the tailing is largely eliminated in the peak 552 of FIG. 5C.

Figure 4G:
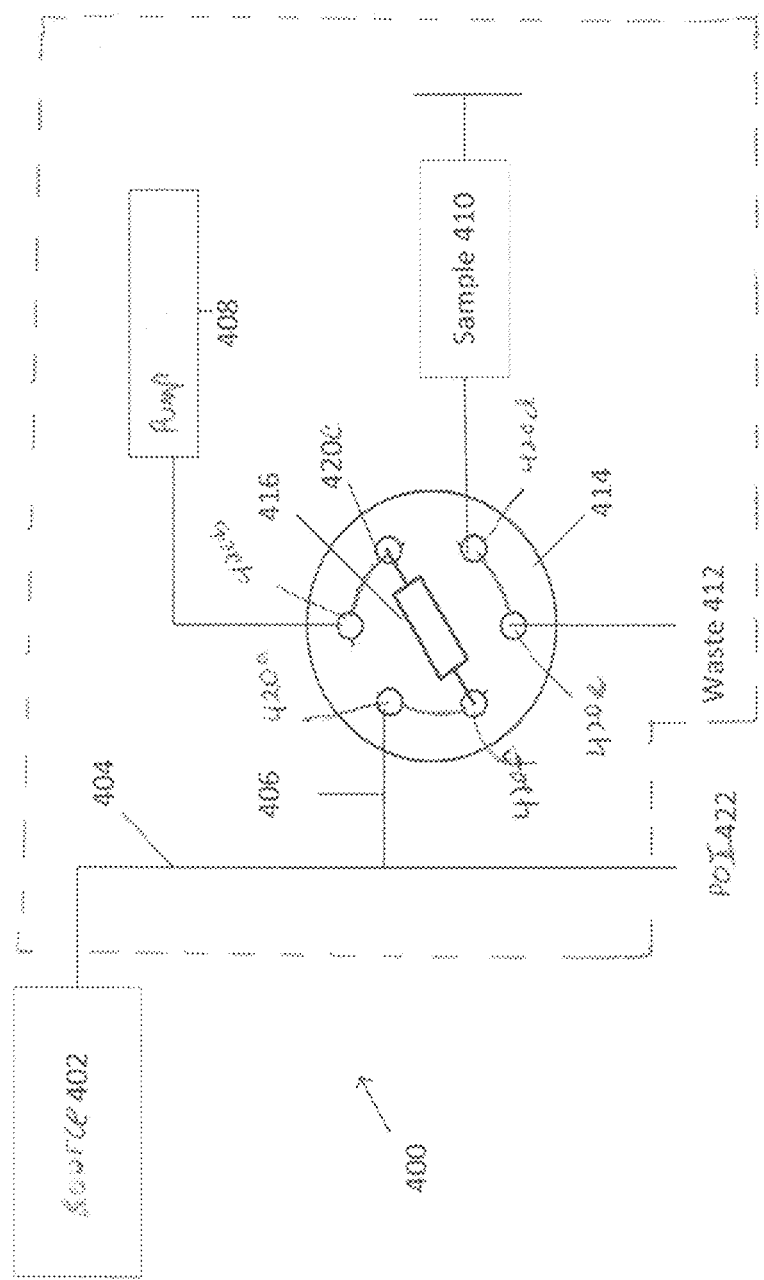
FIG. 4B depicts the remote valve arrangement for introducing calibrant to a flow leading to the POI in the first exemplary embodiment wherein the valve is in an inject position.
Figure 6A:
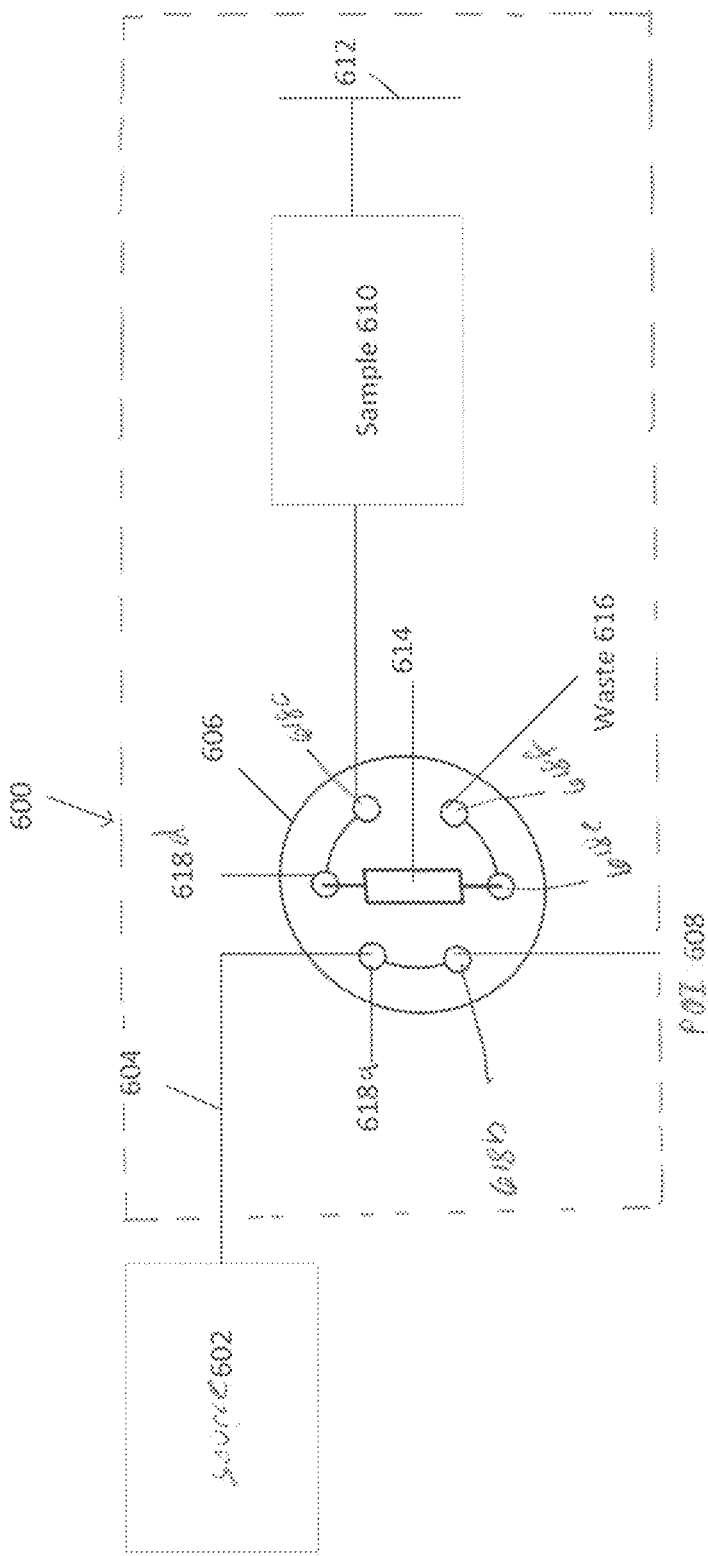
FIG. 6A depicts an inline valve arrangement for introducing calibrant to a flow leading to a POI in a second exemplary embodiment wherein a valve is in a load position.
Figure 7A:
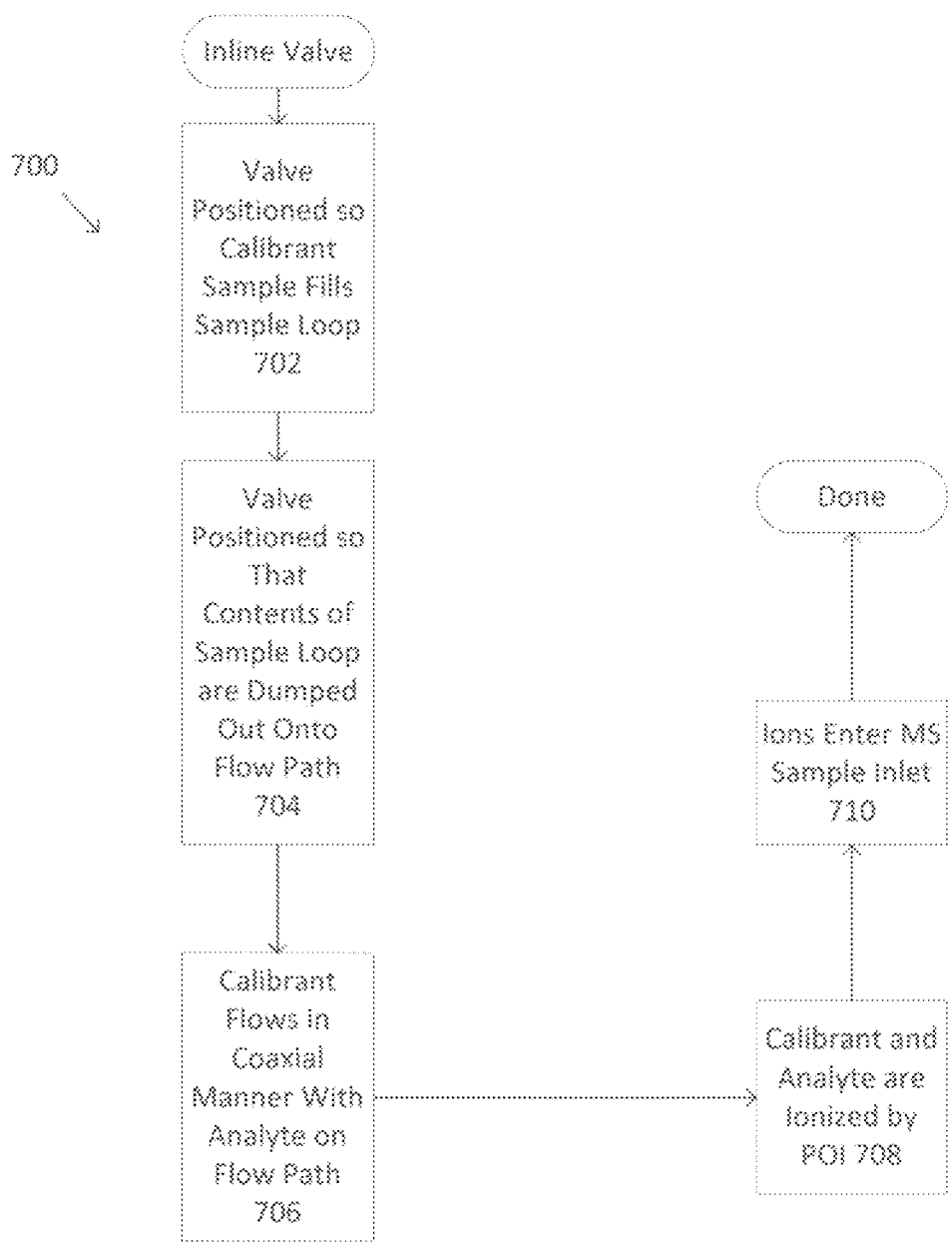
FIG. 7A depicts a flowchart of steps that may be performed in the second exemplary embodiment.

In a second exemplary embodiment, the valve is place in line with the flow from the source of the mobile phase to the interface and ion source 204. FIG. 6A depicts such a calibrant provisioning assembly 600 where the valve 606 is in the load position. A flow path 604 leads from an exit of source of the mobile phase 602 to an ESI 608 in the interface and ion source 204. The valve 606 is positioned in the flow path 604. The valve 606 is largely configured like that shown in FIG. 4 except that ports 618a and 618b are connected to flow path 604 rather than a second flow path. In this valve position, the sample injector 610 inject the calibrant sample through ports 618 where the calibrant flows to port 618d to the sample loop 614 and on to port 618e to port 618 to waste 616. As shown in the flowchart 700 of FIG. 7A, the calibrant sample 610 may be injected by injector 612 to fill the sample loop 614 (702).

Figure 6B:
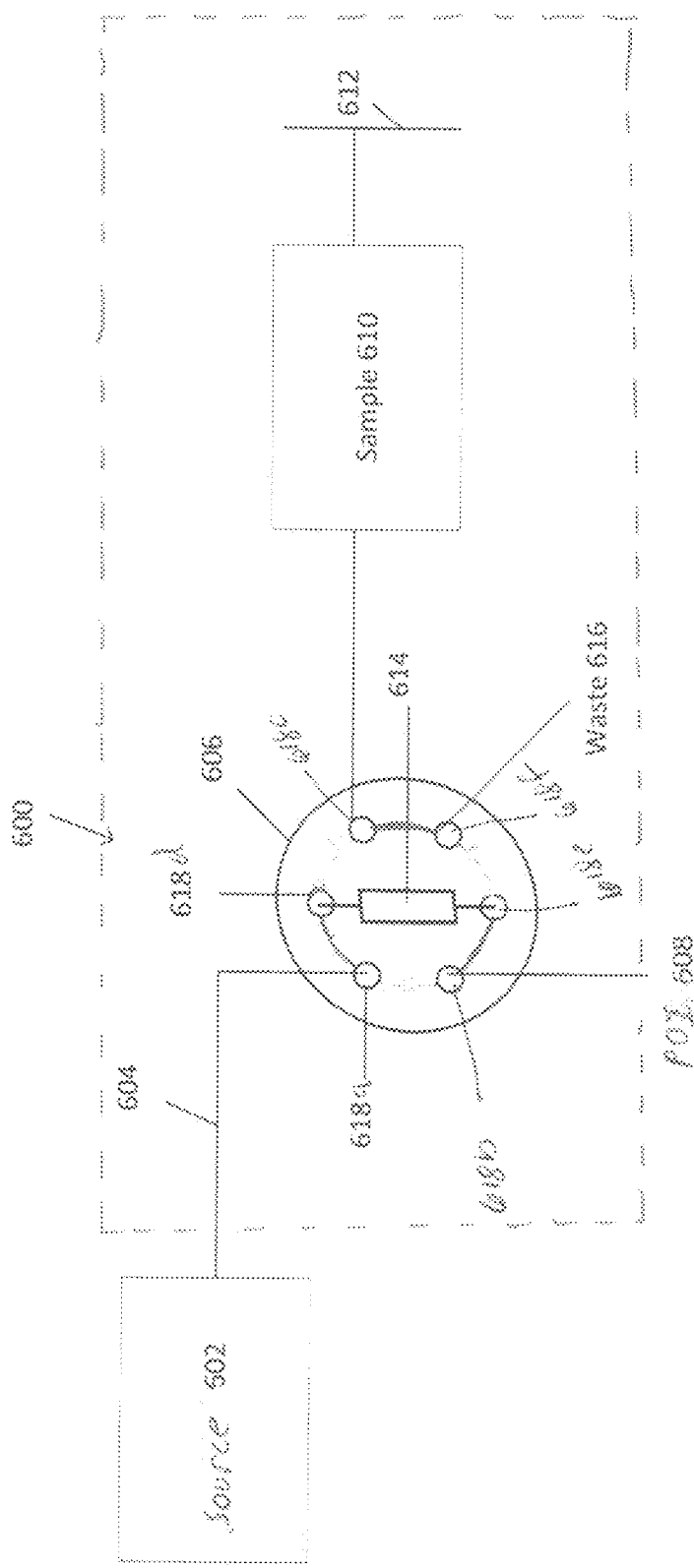
FIG. 6B depicts the inline valve arrangement for introducing calibrant to a flow leading to the POI in the second exemplary embodiment wherein the valve is in an inject position.

The contents of the sample loop 614 may then be dumped onto the flow path 604 by the valve 614 when in the inject position of FIG. 6B (704). In the inject position, the flow from the source of the mobile phase 602 flows into port 618a to port 618d and through the sample loop 614. This flow causes the calibrant sample in the sample loop to flow through port 618*e* and out port 618*b* to the flow path 604. As a result, the calibrant flows in a coaxial manner down the flow path 604 till it reaches the POI 608 (706). The analyte and calibrant are ionized by the POI 608 (708), and the ions then enter the MS sample inlet (710).

The placing of the valve in the flow path may reduce peak width of the calibrant peaks. The fluidic volume from the outlet of the loop to the point of ionization is reduced. Lower volume results in less time for the calibrant to traverse the distance and thus less time for longitudinal diffusion of the sample. The net result is a narrower band. FIG. 7B shows a plot 730 of intensity over time with a single calibrant peak 732. For the same calibrant, flow rate and loop as FIG. 5C, the width of peak 732 at the base of 0.5 seconds is substantially narrower than the width of peak 552 of FIG. 5C at the base of 1 second.

Figure 8:
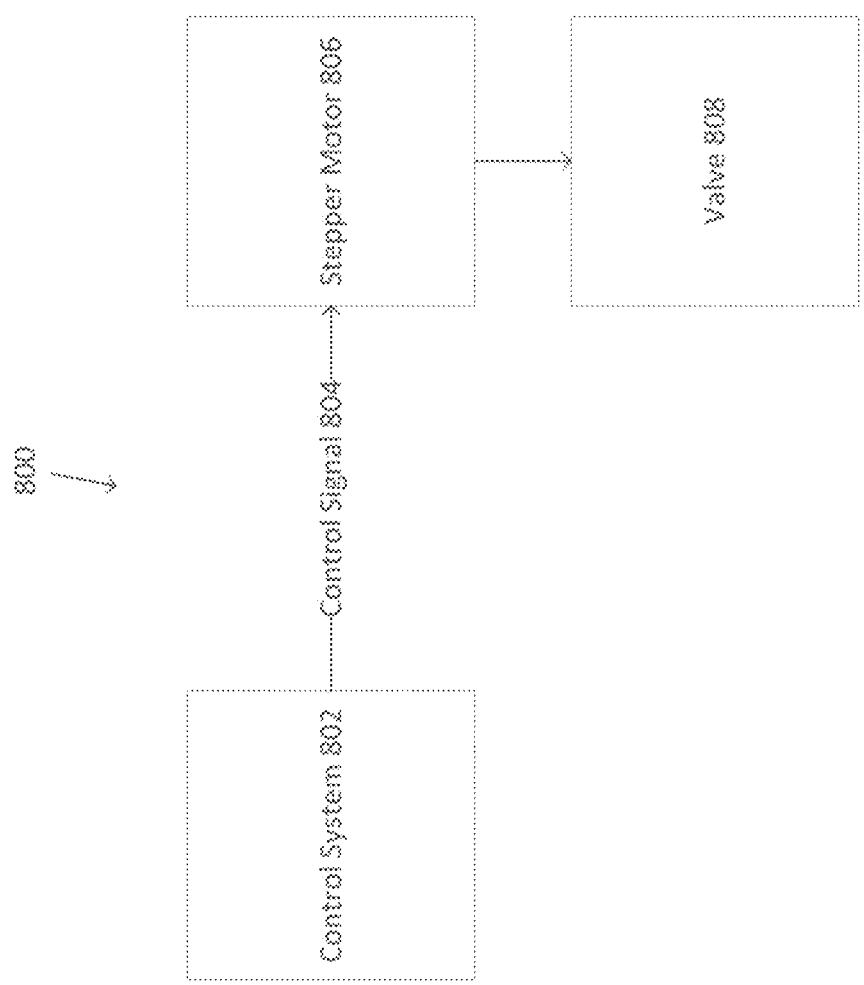
FIG. 8 depicts a block diagram of an illustrative configuration for controlling a valve.

In the exemplary embodiments, the valves are under the control of a control system such as shown in the configuration 800 shown in FIG. 8. A control system 802 controls a valve 808. In the exemplary configuration 800, a stepper motor 806 is used control valve 808. In this illustrative case, it is presumed that the valve 808 is a flat disk valve having a rotor and a stator. The step motor 806 rotationally moves the rotor relative to the stator to achieve the desired valve settings. The stepper motor may assume any one of a number of different step positions. The control system 802 controls the valve by sending a control signal 804 that encodes the desired position of the rotor relative to the stator. The desired position specified in the control signal 804 corresponds to a step position. The stepper motor moves the rotor to the designated step position in response to the control system 802. The control system may be realized through software, a microcontroller, manual controls or the like in different embodiments.

Figure 9:
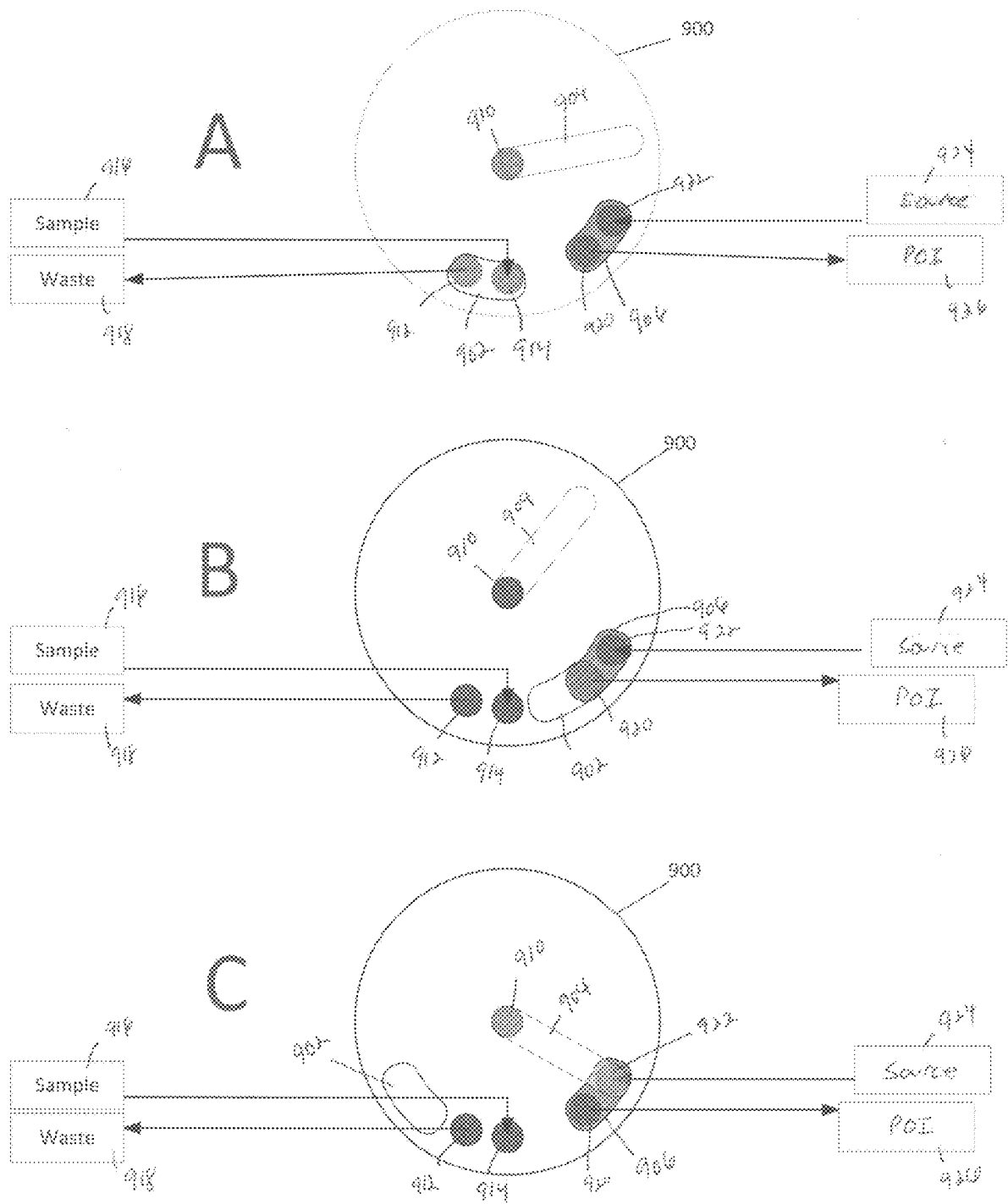
FIG. 9 depicts a five port three position valve suitable for use in exemplary embodiments.

FIG. 9 depicts a valve design that is suitable for practicing the exemplary embodiments. It may be substituted for the valves described above in an inline arrangement or in a remote valve arrangement. The valve 900 is a five port three position flat disk valve having a rotor and a stator. FIG. 9 depicts the valve 900 in the three positions designated as A, B and C. A is the load position for loading calibrant into a sample loop. B is the inject position for injecting the calibrant into the flow leading to the interface and ion source. C is a position to facilitate infusion toward or diversion of the mobile phase away from the ion source.

As can be seen, the rotor has traces 902 and 904. Trace 902 is slightly arcuate and is positioned along the outer periphery of the rotor. Trace 904 is oblong and straight and extends radially outward from a central point. These traces 902 and 904 act as channels that facilitate fluid communication.

The valve 900 has five ports 910, 912, 914, 920 and 922. Port 910 is positioned at the radial center of the valve 900. Ports 912 and 914 are positioned in proximity to each other along the outer periphery of the rotor. Ports 920 and 922 are also positioned in proximity to each other along the outer periphery of the rotor.

The stator has a single trace 906 positioned on the outer periphery of the stator. The trace 906 is slightly arcuate in shape. Since the trace 906 is positioned on the stator it does not move during operation of the valve 900.

During operation, the valve is moved through the positions A, B and C. As can be seen, the rotor is moved rotationally to realize those positions. As a result of the radial movements, the trace 902 and 904 move as shown.

As was mentioned above, the position designated as A is the load position. In this position A, port 914 is connected to an injector 916 for injecting a sample of calibrant. Port 912 is connected to waste 918. The trace 902 is positioned to create a fluid communication path between ports 912 to 914. Hence, the calibrant sample flow to waste 918 and fills the sample loop (in this case the trace 902). Trace 906 is positioned over ports 920 and 922 to be provide a fluid communication path between these ports 920 and 922. Port 922 is connected to an outlet of the source of the mobile phase 924 and received the flow from the source of the mobile phase 924. The flow is passed to port 920 and out to an ESI 926 in the interface and ion source.

In position B, the rotor is moved clockwise so that trace 902 partially overlaps trace 906 as shown. The degree of overlap between 902 and 906 controls the amount of sample from the sample loop transferred to the ESI source. Trace 902 covers port 920. Since ports 912 and 914 are no longer covered by trace 902 and are no longer is fluid communication and since there is the overlap, the calibrant sample is added to the outflow via port 920 leading to the POI 926. Port 922 still receives the flow from the outlet of the source of the mobile phase and passes that flow to port 920 where that flow is combined to coaxially flow with the calibrant Position C facilitates infusion or diversion. The valves depicted previously herein do not have such a position. In position C, the rotor has been rotated so that trace 902 is no longer over any ports and trace 904 is positioned over ports 910 and 922. If the aim is to divert, the flow from the source of mobile phase flow 924 enters port 922 and flows to port 910 which is connected to a destination for the diverted flow. If the aim is to infuse, port 910 is connected to an infusion source and the infused liquid flows from port 910 to port 922 onto port 920. The infused liquid then flows to the POI 926 along with the flow from the column.

Flow may be diverted from the MS to maintain cleanliness of the source. For example, a user may divert the first few seconds of a reversed-phase LC separation away from the ion source since it contains most of the highly charged species. These are not analytically relevant but contribute to contamination of the source, sample inlet, and ion optics within the MS.

Flow may be infused in position C. Infusion is the addition of a known sample in constant amount. Infusion is used to develop Multiple reaction monitoring (MRM) methods, tune the MS, or simply to analyze the contents of a sample which does not require separation.

The position C also allows post-column addition, which is the addition of an ionization-enhancing compound or solvent after the column (as not to affect separation). For example, the mobile phase pH may be changed so a species is separated in a neutral on the column form but changed to a charged form after the column to enhance ionization.

Figure 10:
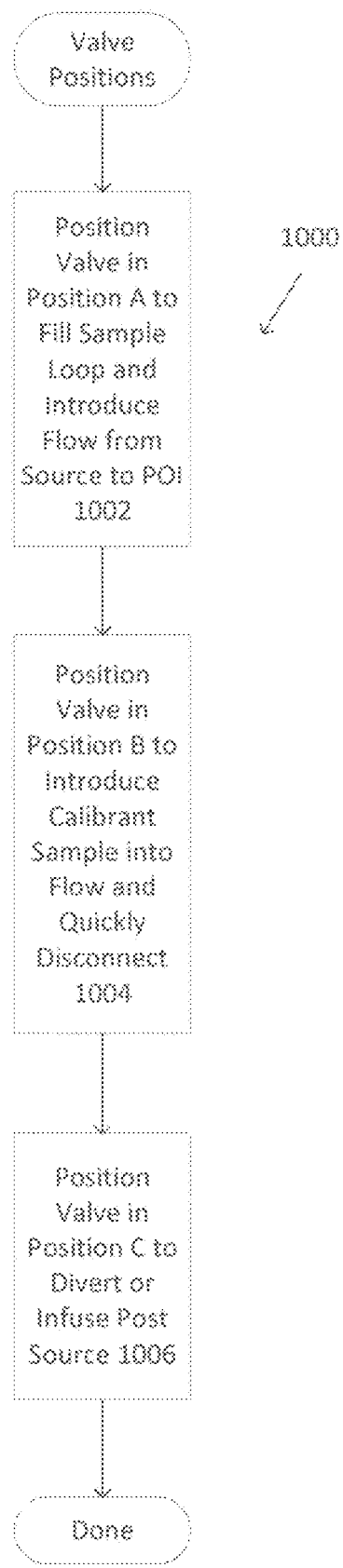
FIG. 10 depicts a flowchart of illustrative steps for using the valve of FIG. 9.

FIG. 10 depicts a flowchart 1000 depicting the sequence of valve positions that may be followed in an exemplary embodiment. Initially, the valve is put in position A to fill the sample loop with calibrant and to introduce flow from the source of mobile phase flow 924 to the POI 926 (1002). After the sample loop is filled, the valve is changed to position B (1004). This cause the calibrant to be introduced coaxially with the flow from the source of the mobile phase flow 924. Then, the valve may be moved to position C to divert flow from the source of the mobile phase flow 924 or to perform an infusion post-source (1006).

While the present invention has been described with reference to exemplary embodiments herein, those skilled in the art will appreciate that various changes in from and detail

The invention claimed is:

1. A mass spectrometry system, comprising:
a source of a mobile phase which includes an analyte;
an ion source for producing ions, the ion source having an input;
a first flow path for the analyte to flow, the first flow path extending from the source of the mobile phase to the ion source;
a second flow path coupled to the first flow path for a calibrant sample to flow to the input of the ion source;
a valve coupled to the second flow path, the valve having:
a first position for filling a sample loop with the calibrant sample;
a second position for causing the calibrant sample to flow from the sample loop to the second flow path onto the first flow path to the input of the ion source;
wherein the valve is separate from the first flow path; and
a mass spectrometer for receiving analyte ions and calibrant ions from the ion source and analyzing the ions.

2. The mass spectrometry system of claim 1, further comprising a calibrant source for providing the calibrant sample.

3. The mass spectrometry system of claim 2, further comprising an injector for injecting the calibrant sample to the valve to fill the sample loop.

4. The mass spectrometry system of claim 1, further comprising a pump connected to the valve.

5. The mass spectrometry system of claim 4, wherein the pump is configured to pump the calibrant sample out of the sample loop when the valve is in the second position.

6. The mass spectrometry system of claim 1, further comprising a detector for detecting the ions.

7. The mass spectrometry system of claim 1, wherein the mobile phase is one of a gas chromatography mobile phase, a liquid chromatography mobile phase, a supercritical fluid mobile phase, or a direct infusion of an analyte or analyte in solution.

8. The mass spectrometry system of claim 1, wherein the ion source is an electrospray ion source.

9. A calibrant provision assembly, comprising:
a first flow path for analyte or a mobile phase to flow to an ion source, the first flow path extending from a source of the mobile phase to the ion source;
a second flow path coupled to the first flow path for a calibrant sample to flow to an input of the ion source;
a sample loop for holding a calibrant sample; and
a valve coupled to the second flow path having:
a first position for filling the sample loop with the calibrant sample, and
a second position for causing the calibrant sample to flow from the sample loop onto the first flow path to the input of the ion source,
wherein the valve is separate from the first flow path.

10. The calibrant provision assembly of claim 9, further comprising an injector for injecting the calibrant sample to the valve to fill the sample loop.

11. The calibrant provision assembly of claim 9, further comprising a pump connected to the valve.

12. The mass spectrometry system of claim 1, wherein the ion source is one of an atmospheric pressure chemical ionizer (APCI), an atmospheric pressure photo ionizer (APPI), an electrospray chemical ionization (ESCi), multi-mode ionization, an impactor spray ionizer, a thermospray ionizer, a fast atom bombardment (FAB), a chemical ionizer (CI), an electron ionizer (EI), a desorption electrospray ionization (DESI) ionizer, a rapid evaporative ionization mass spectrometry (REIMS), a laser ablation electrospray ionization (LAESI) system, or a direct analysis in real time (DART) system.

13. The mass spectrometry system of claim 1, wherein the source of the mobile phase which includes an analyte is a liquid chromatography (LC) system.

14. The mass spectrometry system of claim 1, wherein the source of the mobile phase which includes an analyte is one of a gas chromatography (GC) system, a supercritical fluid (SFC) system, a capillary electrophoresis system, a rapid evaporative ionization mass spectrometry (REIMS) system, or a desorption electrospray ionization (DESI) system.

15. The calibrant provision assembly of claim 9, wherein the ion source is one of an atmospheric pressure chemical ionizer (APCI), an atmospheric pressure photo ionizer (APPI), an electrospray chemical ionization (ESCi), multi-mode ionization, an impactor spray ionizer, a thermospray ionizer, a fast atom bombardment (FAB), a chemical ionizer (CI), an electron ionizer (EI), a desorption electrospray ionization (DESI) ionizer, a rapid evaporative ionization mass spectrometry (REIMS), a laser ablation electrospray ionization (LAESI) system, or a direct analysis in real time (DART) system.

16. The calibrant provision assembly of claim 9, wherein the source of the mobile phase is a liquid chromatography (LC) system.

17. The calibrant provision assembly of claim 9, wherein the source of the mobile phase is one of a gas chromatography (GC) system, a supercritical fluid (SFC) system, a capillary electrophoresis system, a rapid evaporative ionization mass spectrometry (REIMS) system, or a desorption electrospray ionization (DESI) system.

* * * * *